United States Patent [19]
Sharrit et al.

[11] Patent Number: 5,999,990
[45] Date of Patent: Dec. 7, 1999

[54] COMMUNICATOR HAVING RECONFIGURABLE RESOURCES

[75] Inventors: Paul Sharrit, Fountain Hills; Edoardo Campini, Mesa; Curtis L. Cornils, Chandler, all of Ariz.

[73] Assignee: Motorola, Inc., Schaumburg, Ill.

[21] Appl. No.: 09/080,113

[22] Filed: May 18, 1998

[51] Int. Cl.$^6$ .............................. G06F 12/02; G06F 9/46
[52] U.S. Cl. ...................... 710/8; 709/301; 709/103; 710/104; 710/11
[58] Field of Search ........................ 395/674, 677, 395/800.1, 591; 364/281.3, 281.6, 281.8, 228.6, 236.9; 705/8, 9; 710/8, 104, 15; 709/301, 105, 239.9; 707/205, 202

[56] References Cited

U.S. PATENT DOCUMENTS

| | | | |
|---|---|---|---|
| 5,301,320 | 4/1994 | McAtee et al. | 705/9 |
| 5,303,369 | 4/1994 | Borcherding et al. | 395/674 |
| 5,404,516 | 4/1995 | Georgiades et al. | 395/674 |
| 5,528,584 | 6/1996 | Grant | 370/254 |
| 5,535,406 | 7/1996 | Kolchinsky | 395/800.1 |
| 5,537,607 | 7/1996 | Ploger, III | 395/830 |
| 5,602,843 | 2/1997 | Gray | 370/338 |
| 5,712,628 | 1/1998 | Phillips et al. | 340/825.54 |
| 5,712,866 | 1/1998 | Stein et al. | 375/200 |

*Primary Examiner*—Daniel H. Pan
*Attorney, Agent, or Firm*—John C. Scott; Frank J. Bogacz

[57] ABSTRACT

A communicator (10) includes a plurality of reconfigurable resource units (13) that can each be dynamically altered to perform any of a multitude of processing tasks. A controller (16) determines a plurality of processing tasks to be supported by the communicator (10) and configures the plurality of reconfigurable resource units (13) accordingly. A memory (18) stores a library of configuration files for use by the controller (16) in configuring the plurality of reconfigurable resource units (13). In one embodiment, the controller (16) continuously adapts the plurality of reconfigurable resource units (13) according to present system requirements.

32 Claims, 5 Drawing Sheets

COMMUNICATOR HAVING RECONFIGURABLE RESOURCES

STATEMENT OF GOVERNMENT RIGHTS

This invention was made with government support under Contract No. F30602-95-C-0026 awarded by the U.S. Air Force. The Government has certain rights in this invention.

FIELD OF THE INVENTION

The present invention relates in general to communications systems and, more particularly, to communications systems utilizing programmable elements.

BACKGROUND OF THE INVENTION

Communications systems of the past generally use communications equipment that is designed to perform one or a small number of preassigned tasks for effecting communication between users. Such equipment generally works well within a narrow range of designed operation, but is unable to adapt to changing system requirements. Systems including this equipment, therefore, have a limited range of uses and are prone to become obsolete before the associated hardware has reached a projected useful lifetime. This leads to a situation where costly system redesigns are common and functional hardware units are being prematurely discarded.

Therefore, there is a need for communications equipment that is adaptable to changing system requirements.

DETAILED DESCRIPTION OF THE DRAWINGS

The present invention relates to a communicator having an architecture that is capable of adapting to varying system requirements. The communicator includes a plurality of reconfigurable resource units (RRUs) that can each be dynamically altered during operation for performing any of a variety of processing tasks. The communicator also includes a controller for dynamically allocating the RRUs based on current system requirements. The controller has access to a library of configuration files that can be used to reconfigure the plurality of RRUs according to a desired allocation plan. To support varying system requirements, the communicator is capable of receiving and implementing new configuration files from an exterior environment. For example, if the communicator is to support a new or modified signal format, one or more configuration files associated with the signal format can be delivered to the communicator for use therein. The communicator can be located anywhere within a communications system, such as in a basestation or a handheld transceiver unit.

Figure 1:
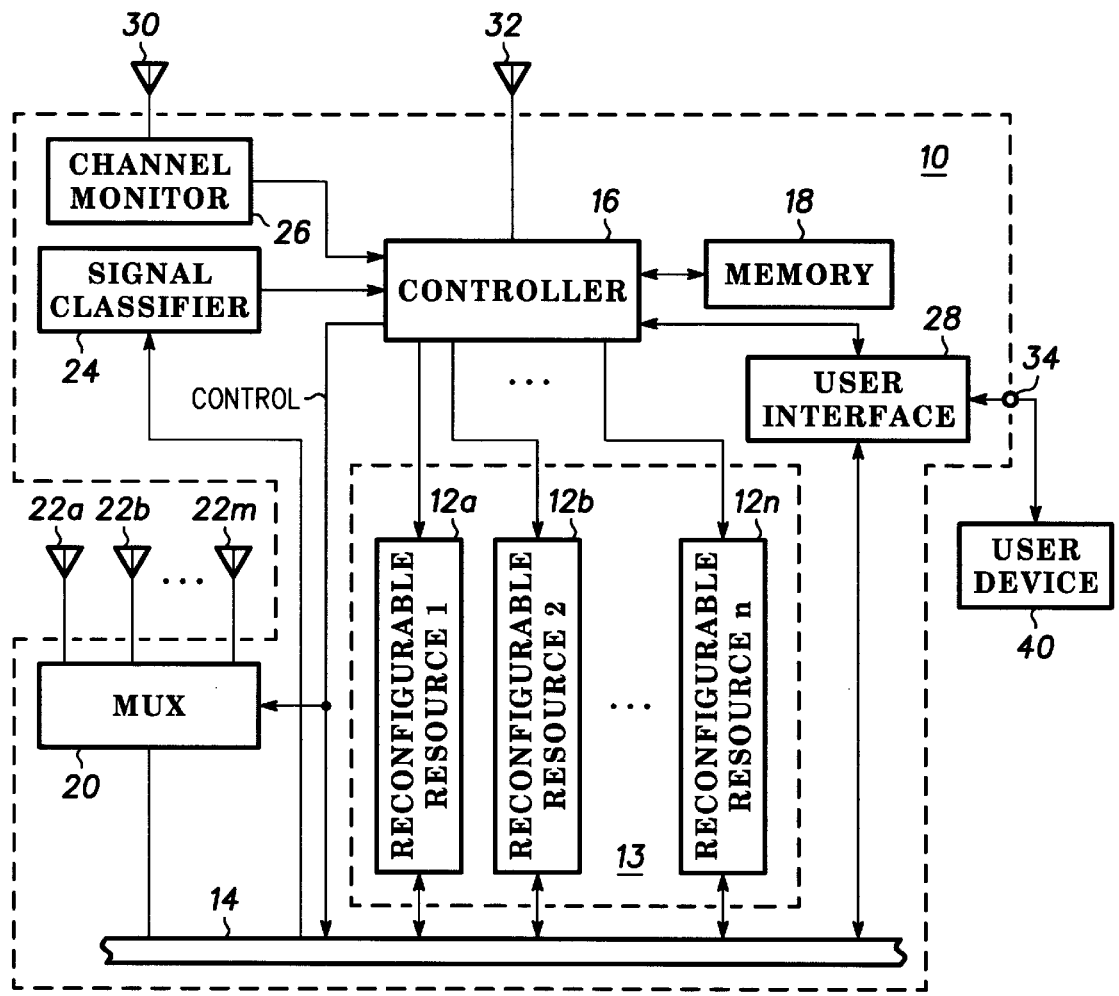
FIG. 1 is a block diagram illustrating a communicator in accordance with one embodiment of the present invention.

FIG. 1 is a block diagram illustrating a communicator 10 in accordance with one embodiment of the present invention. The communicator 10 operates as a transceiver for use in transmitting communication signals into a wireless communications channel and for receiving communication signals from the wireless communications channel. As illustrated, the communicator 10 includes: a plurality of reconfigurable resource units (RRUs) 13, a signal bus 14, a controller 16, a memory 18, a multiplexer 20, a signal classifier 24, a channel monitor 26, and a user interface 28. The signal bus 14 is operative for transferring communications signals between various elements in the communicator 10. In accordance with the present invention, the communications signals can include virtually any type of information such as, for example, computer data, voice information, video information, and/or still image information. In one embodiment, as illustrated in FIG. 1, the signal bus 14 is coupled to the plurality of RRUs 13, the multiplexer 20, and the user interface 28 for use in transferring signals therebetween. The multiplexer 20 is coupled to a plurality of antennas 22a–22m for providing an interface between the signal bus 14 and any of a plurality of wireless communications channels. In addition, the user interface 28 is coupled to a user device 40, via input/output port 34, for providing communication between the signal bus 14 and a user of the communicator 10. Accordingly, signal bus 14 can be used to transfer signals between, for example, an RRU and a wireless communications channel, an RRU and a user, or between individual RRUs.

Each of the plurality of RRUs 13 includes signal processing functionality for processing signals on the signal bus 14. In accordance with the present invention, each of the RRUs can be dynamically altered in the field to change the processing functions they are configured to perform. That is, a particular RRU (e.g., RRU 12a) can be set up to perform one set of processing functions at one moment and a different set of processing functions at another moment, based on current system requirements. To provide this ability, each of the RRUs 12a–12n includes an input port for receiving configuration information from the controller 16. The RRUs 12a–12n restructure themselves in accordance with the configuration information to provide the additional or alternative functions. As will be described in greater detail, each of the RRUs 12a–12n can take any one of a large variety of different forms.

As will be described in greater detail, the controller 16 is operative for, among other things, controlling the operation and configuration of the plurality of RRUs 12a–12n. The controller 16 also controls the operation of the bus 14, the multiplexer 20, and the user interface 28. The controller 16 can include virtually any type of processor capable of controlling the specified elements, such as a conventional microprocessor or a digital signal processor.

The multiplexer 20 is operative for selectively coupling one or more of the plurality of antennas 22a–22n to the signal bus 14 in response to a control signal from controller 16. In a preferred embodiment of the present invention, each of these antennas is optimized for operation in a specific frequency band that is different from the other antennas. During operation, the controller 16 determines the operational frequency range of an external system that is to be communicated with and chooses an antenna accordingly. In this manner, communicator 10 can be made operational over a very wide bandwidth. An alternative antenna arrangement uses a single broadband antenna in place of the multiplexer 20 and plurality of antennas 22a–22m. In narrow band implementations, the multiplexer 20 and array of antennas 22a–22n can be replaced by a single narrowband antenna. In another embodiment, a phased array antenna generating multiple beams is utilized. In this approach, the controller 16 is used to select which of the beams will be coupled to the signal bus 14 at a particular time. Each of the beams can also be independently steerable. Other antenna arrangements can also be used in accordance with the present invention.

Signal classifier 24 is operative for classifying signals on signal bus 14 according to signal format. The signal classifier 24 outputs a format signal to controller 16 for use by the controller 16 in, for example, determining a type of processing that needs to be performed by the plurality of RRUs 13. As will be discussed in greater detail, the controller 16 can reconfigure the plurality of RRUs 13 based on this determination. The signal classifier 24 can utilize any of a large number of signal classification methods that are known in the art.

The channel monitor 26 is coupled to an antenna 30 for use in monitoring the spectral environment surrounding the communicator 10. The channel monitor 26 outputs spectrum information to the controller 16 for use in, among other things, configuring the plurality of RRUs 13. For example, the spectrum information may indicate that there is a relatively strong interference signal in the channel that could compromise communications at a particular frequency. The controller 16 can use this information to reconfigure an RRU to generate a transmit signal at a different center frequency than was previously being used. The controller 16 will also need to communicate the change of center frequency to an intended recipient of the transmit signal.

In another application, controller 16 uses the spectrum information from the channel monitor 26 to determine an appropriate antenna for connection to bus 14. For example, the spectrum information may identify a rather large signal in a portion of the spectrum utilized by one of the antennas 22a–22n. Using multiplexer 20, controller 16 can connect that antenna to the signal bus 14 to further investigate the unidentified signal. Once the signal is on the signal bus 14, the controller 16 can use the signal classifier to determine whether the signal is of interest. If the signal is of interest, the controller 16 can process the signal in one or more of the RRUs 12a–12n based on a signal format identified by signal classifier 24. The processed signal will then be delivered to the user device 40 via user interface 28. The controller 16 can also use the spectrum information for other purposes.

The user device 40 can be virtually any type of input/output device. In one embodiment, for example, user device 40 includes an LCD display, a speaker, a microphone, and a digital keypad. This embodiment is useful in, for example, handheld communicator applications. In addition to the basic number keys, additional function keys (such as programmable macro keys) can be provided on the keypad. A user can deliver commands to the controller 16 by pressing a particular key, or sequence of keys, on the keypad. For example, in one application, a user can command the controller 16 to establish a particular communications link with an external communication system using the keypad. In another application, a user can deliver a command to controller 16 requesting that a new signal format be supported by the communicator 10. Once a desired communications link has been established, user device 40 can be used to deliver communications information to signal bus 14, via user interface 28, for processing into the appropriate signal format for transmission into the wireless communications channel. In this regard, the user device 40 can include functionality for placing the communications information into an appropriate format for delivery to the bus 14. This functionality can include, for example, an analog-to-digital converter for converting an analog speech signal into a digital representation.

In another embodiment of the present invention, the user device 40 comprises a personal computer. This embodiment is useful in, for example, base station applications. The personal computer can also be used to deliver connection requests and/or reconfiguration commands to the controller 16. In addition, the personal computer can deliver new and/or updated configuration files to the controller 16 for storage in the memory 18. Also, the personal computer can support a wider array of information types. That is, voice, video, and computer data, for example, can be supported.

The user interface 28 provides a transition between the user device 40, the controller 16, and the signal bus 14. That is, the function of the user interface 28 is to direct commands and communication information to an appropriate device and to provide the necessary signal format transformations required for the commands and communication information to be recognizable by the appropriate device. In one embodiment of the present invention, the user interface 28 is also reconfigurable for supporting varying user devices.

The signal bus 14 can include virtually any type of signal distribution apparatus. In a preferred embodiment of the invention, a new breed of high performance, low cost, compact interconnecting buses are used. These buses include, for example, the commercially available Firewire, universal serial bus (USB), and peripheral component interconnect (PCI) bus structures. In an alternative embodiment, signal bus 14 is replaced by a large multiplexer that is under the control of the controller 16. Using the multiplexer, the controller 16 can direct a received signal to an appropriate RRU in the plurality of RRUs 13 to perform desired processing. The selected RRU can then deliver a processed output signal to user device 40 via a hardwired connection. In yet another embodiment, the plurality of RRUs 13 are daisy chained one after the other. The controller 16 can then selectively enable one or more of the RRUs to process the signal as it propagates through the chain of RRUs. Non-enabled RRUs will appear as through lines to the propagating signal. The output of the last RRU in the chain is then delivered to the user device 40 via user interface 28.

As described above, the communicator 10 of FIG. 1 operates as a transceiver for use in transmitting communication signals into a wireless communications channel and for receiving communication signals from the wireless communications channel. During a receive operation, a communication signal is received from a wireless communications channel by one of the plurality of antennas 22a–22n. Although not shown, each of the antennas 22a–22n can be coupled to appropriate processing functionality to place the received signal in an appropriate format for delivery to the bus 14. The processing functionality can include, for example, a downconverter and/or an analog-to-digital converter. In accordance with the present invention, this processing functionality can also be reconfigurable. The signal is next transferred to signal bus 14 via multiplexer 20. Controller 16 then determines a type of processing to be performed on the received signal. In one embodiment, as discussed above, the controller 16 uses signal format information from signal classifier 24 to determine the type of processing to be performed. The controller 16 then enables one or more of the RRUs 12a–12n to read the signal from the signal bus 14 and perform the required processing.

If none of the RRUs 12a–12n are presently configured to perform the required processing, the controller 16 can reconfigure one or more of the RRUs 12a–12n. As will be discussed in more detail, the controller 16 can utilize a priority system to determine which of the RRUs 12a–12n to reconfigure. A particular receive signal on signal bus 14 may need to be processed in multiple RRUs before being delivered to a user at user device 40. In one embodiment, this processing is done in a sequential manner, where the signal is individually processed by separate RRUs one after the other. In another embodiment, multiple RRUs are linked together to process the signal in tandem. Once all of the required processing is completed, the resulting signal is transferred to signal bus 14 for delivery to the user via user interface 28.

During a transmit operation, information from user device 40 is delivered to signal bus 14 via user interface 28. Based on a desired transmit signal format, controller 16 causes the information from user device 40 to be encoded and/or modulated in one or more of the RRUs 12a–12n to achieve the required signal format. When processing is complete, controller 16 causes the signal to be delivered from the plurality of RRUs 13 back to the signal bus 14, from which it is transferred to an appropriate antenna via multiplexer 20. The antenna then transfers the signal into a wireless communications channel. As before, if none of the RRUs 12a–12n are configured for processing the user information to achieve the desired signal format, the controller 16 will reconfigure one or more of the RRUs 12a–12n to include the required functionality.

Figure 2:
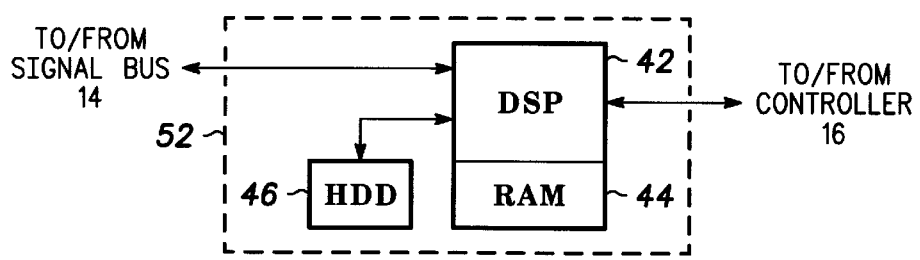
FIG. 2 is a block diagram illustrating a reconfigurable resource unit (RRU) in accordance with one embodiment of the present invention.

In accordance with the present invention, the RRUs 12a–12n can each include any type of processing device that can be dynamically altered to perform varying processing functions. For example, as illustrated in FIG. 2, an RRU 52 can include a digital signal processor (DSP) 42 coupled to a random access memory (RAM) 44. The DSP 42 is coupled to controller 16 for receiving, among other things, processing commands instructing the DSP 42 how to process a signal presently on signal bus 14. The DSP 42 then reads the signal from the signal bus 14 and processes it by executing one or more software programs stored in RAM 44. If a required program is not presently stored in RAM 44, the controller 16 can deliver the program to the DSP 42 for storage in the RAM 44. Alternatively (or in addition), the RRU 52 can include a mass storage unit, such as a hard disk drive (HDD) 46, for storing a library of programs that can be executed in the DSP 42. When the DSP 42 receives a processing command from the controller 16, it can transfer an appropriate program file from HDD 46 into RAM 44 for use in processing a signal from signal bus 14. To reconfigure RRU 52, controller 16 can deliver additional software programs to DSP 42 for storage in HDD 46. These programs can include software objects that can be linked into a larger program already resident in RRU 52. This requires DSP 42 to include appropriate linkage functionality.

Figure 3:
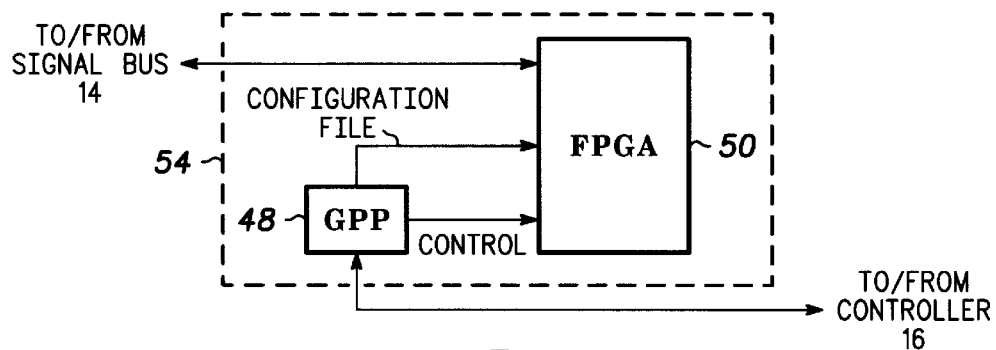
FIG. 3 is a block diagram illustrating an RRU in accordance with another embodiment of the present invention.

In another approach, as illustrated in FIG. 3, an RRU 54 includes a general purpose processor (GPP) 48 and a field programmable gate array (FPGA) 50. An FPGA is a hardware device having a large number of individual logic cells arranged in an array configuration. These logic cells can be interconnected in a multitude of different configurations for performing any of a large number of different processing tasks. In addition, some FPGAs utilize logic cells that are themselves programmable, thereby providing an even higher level of configurability. To configure an FPGA, a configuration file is delivered to an input of the FPGA. The configuration file includes, among other things, information describing a manner for interconnecting cells within the FPGA. The configuration file can also include, for example, information for configuring individual cells in the array. FPGAs now exist that allow different functions to be implemented in different portions of the cell array. That is, a single FPGA can be used to implement multiple different functions in different locations within the FPGA. An FPGA having this feature requires an input/output functionality that directs signals to be processed to the appropriate portion of the array. FPGAs are available for processing both digital and analog signals.

With reference to FIG. 3, the GPP 48 is coupled to the controller 16 for receiving instructions on how to process a signal on bus 14. In response to the instructions, the GPP 48 delivers a control signal to FPGA 50 instructing it to read the signal on signal bus 14 and to process the signal in an appropriate area of the cell array. The GPP 48 can also receive configuration files from the controller 16 for use in reconfiguring the FPGA 50. GPP 48 then delivers the configuration files to a designated portion of FPGA 50.

Figure 4:
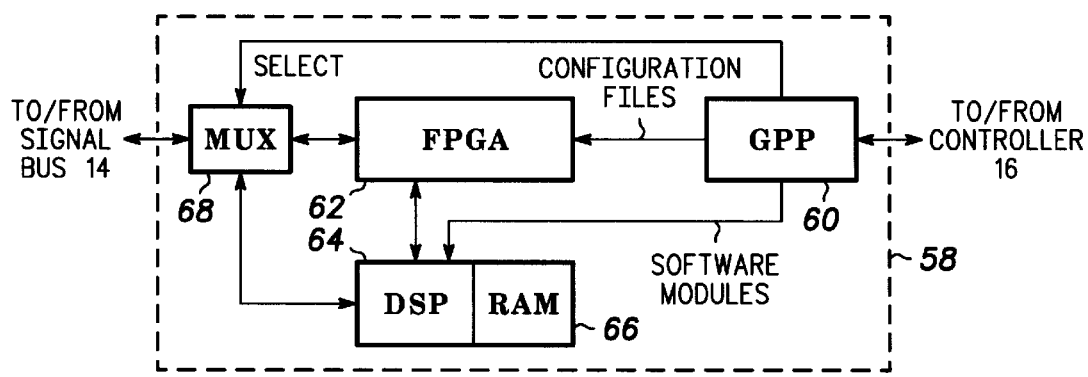
FIG. 4 is block diagram illustrating an RRU in accordance with yet another embodiment of the present invention.

FIG. 4 is a block diagram illustrating an RRU 58 that includes both hardware and software programmability. That is, RRU 58 includes: a GPP 60, an FPGA 62, a DSP 64 with associated RAM 66, and a multiplexer 68. RRU 58 is a hybrid unit which allows controller 16 to specify whether a signal currently on signal bus 14 will be processed in hardware (in FPGA 62) or in software (in DSP 64). Based on commands from controller 16, GPP 60 delivers a select signal to multiplexer 68 that directs the signal on bus 14 to the desired processing unit. GPP 60 is also operative for delivering configuration files to FPGA 62 and/or software programs (e.g., software modules) to DSP 64 as needed to reconfigure these units. It should be appreciated that the above-described RRU configurations are merely exemplary of the large number of configurations that can be utilized in accordance with the present invention. For example, reconfigurable units can also be implemented using devices such as fast flash memories and various forms of non-volatile memory.

In accordance with the present invention, the communicator 10 can also make use of fixed function processing units. These fixed function processing units can be coupled to the signal bus 14 in the same manner that the RRUs 12a–12n are coupled to the bus 14. The controller 16 can then direct selected processing tasks to the fixed function processor units as needed.

Figure 5:
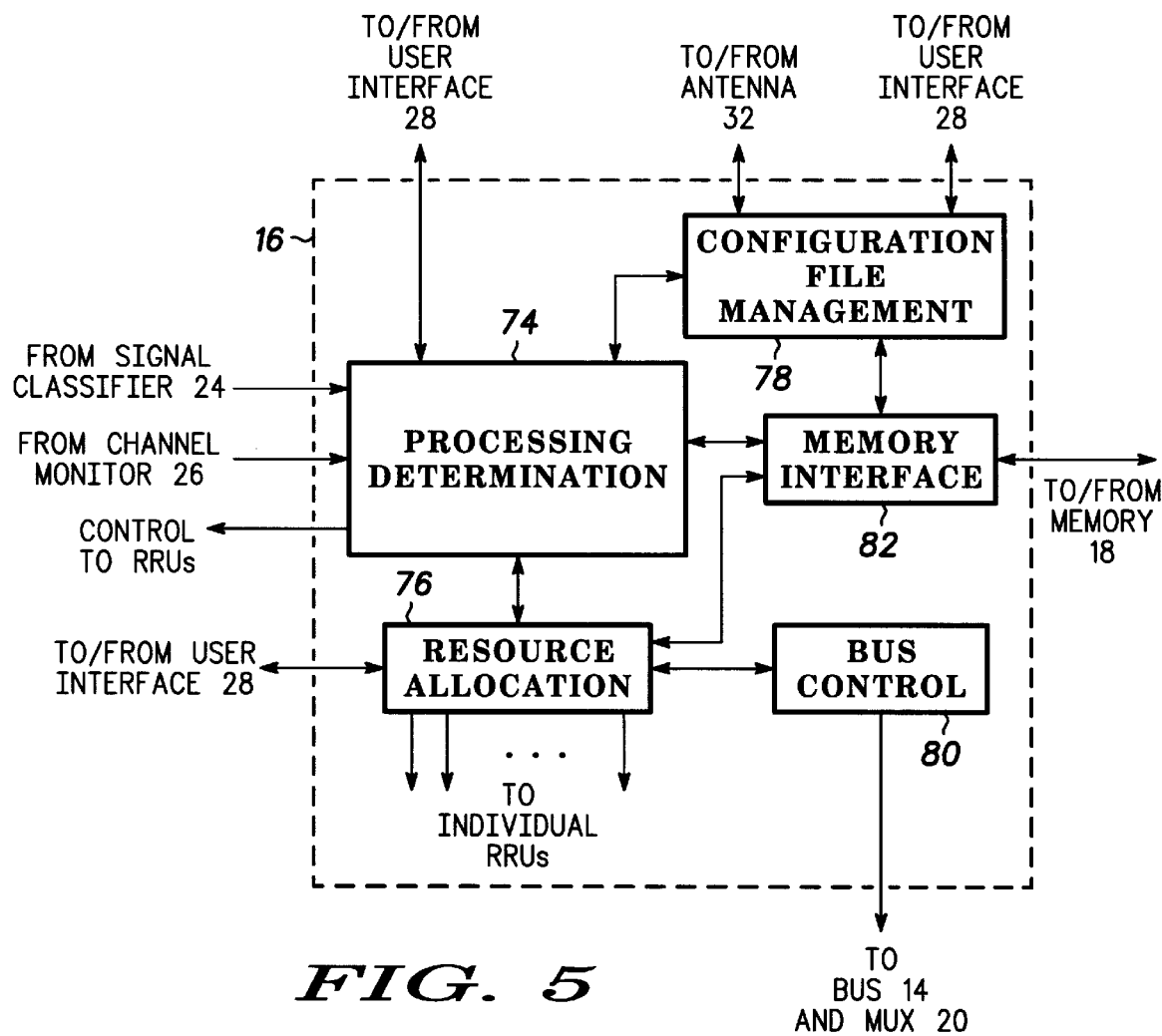
FIG. 5 is a block diagram illustrating a controller in accordance with one embodiment of the present invention.

FIG. 5 is a block diagram illustrating a controller 16 in accordance with one embodiment of the present invention. As illustrated, the controller 16 includes: a processing determination unit 74, a resource allocation unit 76, a configuration file management unit 78, a bus control unit 80, and a memory interface unit 82. The functionality represented by the controller elements is preferably implemented in software, although hardware implementations are also possible. The processing determination unit 74 is operative for determining a type of processing that needs to be performed within the communicator 10. In the preferred embodiment, the processing determination unit 74 uses signals from the signal classifier 24, the channel monitor 26, and/or the user interface 28 to determine the required processing. For example, if the signal classifier 24 indicates that a received signal having a particular signal format is presently on signal bus 14, the processing determination unit 74 will determine that certain processing functions need to be performed on the signal to convert it to a signal format recognizable by the user device 40. Similarly, if the channel monitor 26 indicates that a particular wireless communication channel is very noisy, the processing determination unit 74 can decide that additional processing is to be performed on a signal received from that channel. In addition, the processing determination unit 74 can determine processing functions that need to be performed based on commands received from the user (via user interface 28). For example, the user can request that a wireless communications link be established with a specific external system. The controller 16 knows the signal format used by the external system and can therefore determine the type of processing that needs to be done to an information signal from the user device 40 to generate a transmit signal for delivery to the external system.

Resource allocation unit 76 is operative for allocating the resources of the plurality of RRUs 13 to the various processing tasks that need to be performed in the communicator 10. In addition, the resource allocation unit 76 keeps track of the location of various processing functions within the plurality of RRUs 13. For example, a particular demodulation function may be located in a particular area of an FPGA in RRU 12a. When processing determination unit 74 determines that the demodulation function needs to be performed on a signal on bus 14, resource allocation unit 76 tells the processing determination unit 74 where the function is located and the processing determination unit 74 causes the bus signal to be delivered to the appropriate location for processing.

In addition to its resource tracking responsibilities, the resource allocation unit 76 is also operative for dynamically modifying the resource allocation scheme based on present system requirements. That is, resource allocation unit 76 is continuously monitoring system requirements and reconfiguring the plurality of RRUs 13 based thereon. To monitor system requirements, the resource allocation unit 76 can use information received from a variety of sources. For example, resource allocation unit 76 can utilize information from processing determination unit 74 to determine processing functions that should be available within the plurality of RRUs 13. If processing determination unit 74 determines that a particular encoding function needs to be performed, and that encoding function is not presently available in the plurality of RRUs 13, resource allocation 76 can deliver an appropriate configuration file to the plurality of RRUs 13 for implementing the encoding function.

Resource allocation unit 76 can also receive instructions from the user device 40, via user interface 28, instructing the unit 76 to provide specific functionality. For example, a user may desire communicator 10 to be interoperable with an external communication system that uses a specific signal format. In accordance with the present invention, the user can instruct the resource allocation unit 76 to provide the necessary interface functionality somewhere within the plurality of RRUs 13. The resource allocation unit 76 then downloads the appropriate configuration file from the memory 18 via memory interface 82.

If a desired configuration file is not located within memory 18, alternate sources of configuration information are provided. For example, configuration file management unit 78 is operative for receiving configuration files from multiple sources and for organizing and tracking the configuration files within the memory 18 (using memory interface 82). In a preferred embodiment, the configuration file management unit 78 is coupled to: (a) the user interface 28 for receiving configuration files from a user, and (b) antenna 32 for receiving configuration files from an exterior source, via a wireless communication channel. Other means for obtaining configuration files can also be provided.

Bus control unit 80 is operative for controlling the transfer of information between the signal bus 14 and the various system elements. Bus control procedures are generally known in the art and will therefore not be discussed further.

In one embodiment of the invention, processing determination unit 74 uses spectral profile information from channel monitor 26 to determine an optimum waveform for transmission into a wireless communication channel. This optimum waveform may, for example, be tailored to fill in available gaps in the channel spectrum. After determining the optimum waveform, the processing determination unit 74 instructs the resource allocation unit 76 to provide the processing functionality required to generate the desired waveform. The resource allocation unit 76 then downloads the appropriate configuration files from memory 18 and delivers them to selected RRUs.

In general, the resource allocation unit 76 will determine a present resource allocation scheme based upon a predetermined set of rules. The rules will determine when, for example, a requested processing function can be provided and when not. These rules will also determine where in the plurality of RRUs 13 a desired function will be implemented. For example, a situation may arise where the plurality of RRUs 13 is almost fully configured with functions and a user of the communicator 10 wishes to add a new function. The rules can specify the conditions under which the new function will be added and where in the plurality of RRUs 13 the new function will be implemented. In another possible scenario, none of the plurality of RRUs 13 individually have enough resources available to implement a desired function, but a combination of RRUs can provide the required resources. In such a scenario, the resource allocation unit 76 can divide the function between multiple RRUs. The resource allocation unit 76 can also include means for reorganizing functions within the plurality of RRUs 13 to make more efficient use of the resources. This function is somewhat similar to hard disk defragmentation procedures used in the disk drive industry. By properly organizing functionality within the plurality of RRUs 13, system throughput can be significantly increased.

Figure 6:
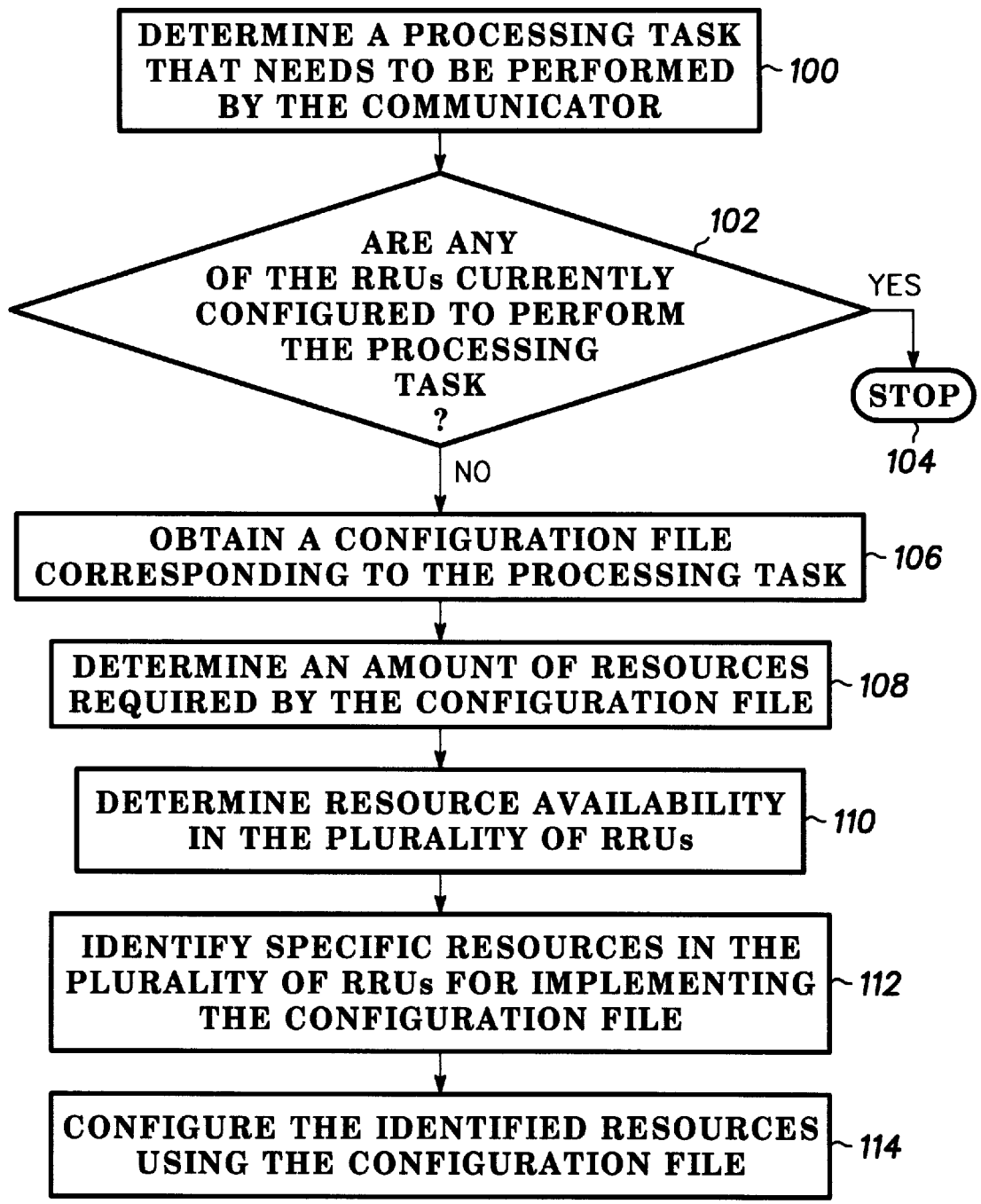
FIG. 6 is a flowchart illustrating a method for reconfiguring a plurality of RRUs in accordance with one embodiment of the present invention.

FIG. 6 is a flowchart illustrating a procedure for reconfiguring the plurality of RRUs 13 in one embodiment of the present invention. First, a processing task that needs to be performed by the communicator 10 is identified (step 100). The processing task can include virtually any task that may be required in a communications system. For example, the task may include: (a) support for a new or modified signal format (such as a particular demodulation function), (b) a mathematical function (such as integration), or (c) a standard communications function (such as downconversion), to name a few. Next, it is determined whether any of the plurality of RRUs 13 are currently configured to perform the processing task (step 102). If one or more of the RRUs are configured to perform the processing task, the procedure is stopped (step 104) and the required processing task is performed. If not, a configuration file corresponding to the desired processing task is obtained (step 106). As discussed previously, the configuration file may be stored in the memory 18 or it can be obtained from an exterior source. After a configuration file is obtained, an amount of resources needed to implement the configuration file is determined (step 108). If the configuration file is an FPGA configuration data file, the file may include a preamble portion indicating resource requirements. The preamble portion can be read by the resource allocation unit 76 to determine the amount of required resources. In another scenario, the size of the configuration file can be used to estimate an amount of required resources. Also, a lookup table approach can be used to track resource requirements. Other methods for determining required resources are also possible.

Next, resource availability in the plurality of RRUs 13 is checked (step 110). In one embodiment of the present invention, a resource availability map is maintained that indicates portions within each of the RRUs 12a–12n that are not currently configured for performing a desired function (or are configured for performing less important or outdated functions). Specific available resources are then identified within the plurality of RRUs 13 for implementing the configuration file (step 112). In one embodiment of the invention, a resource availability map is checked for each RRU to determine whether a single block of available resources exists in the RRU in the required size. If none of the RRUs include a single block of available resources in the required size, it is next determined whether multiple available blocks within a single RRU can be combined to provide the required functionality. If not, a combination of resource blocks from separate RRUs is considered. After the appropriate resources have been identified, the configuration file is used to configure the resources (step 114). If a single block of resources is not available for implementing the configuration file, additional work needs to be done to properly configure the available resources.

As discussed above, situations can arise when the plurality of RRUs is almost fully configured with functions. In such a situation, new functions can be implemented only if one or more older functions are removed. In accordance with the present invention, a priority system is provided for prioritizing the allocation of resources between desired processing functions. That is, each function that is to be supported by the communicator 10 is given a priority value based on its overall importance in the communicator 10. The priority value can be, for example, a number between 1 and 10 where 1 designates the lowest priority and 10 designates the highest priority. If a processing function is absolutely mandatory for the communicator 10 to perform, the processing function will receive a priority value of 10. This processing function will never be removed from the plurality of RRUs 13. Other functions which are not as important will receive a lower priority value. When a new function is identified by the processing determination unit 74, the function will immediately receive a priority value. If that priority value is higher than functions already implemented in the plurality of the RRUs 13, and the plurality of RRUs 13 do not have any available resources, the lower priority functions will be replaced by the new function. Many times a new function identified by the processing determination unit 74 will take priority over all or most of the other functions. This may occur when it is absolutely mandatory that a signal having a specific waveform be transmitted into a communications channel (such as may be required in emergency situations). In one embodiment, the priority values assigned to various processing tasks are dynamically changed over time. For example, a function for generating a particular waveform may decrease in importance over time based on, for example, changing signal protocols. The priority value assigned to this task can therefore be correspondingly lowered.

Figure 7:
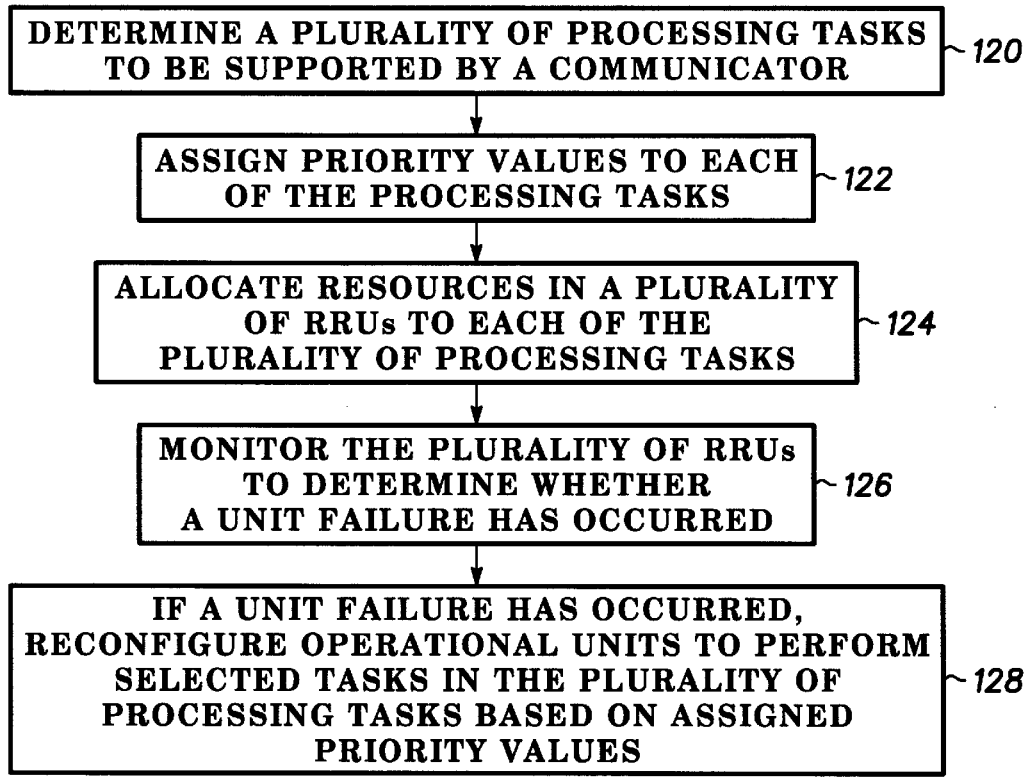
FIG. 7 is a flowchart illustrating a method for providing enhanced graceful degradation in a communicator unit in accordance with one embodiment of the present invention.

A very important advantage of the present invention over past communicator designs is the ability to provide graceful degradation. That is, a single RRU failure within a communicator of the present invention will not render the communicator useless. Communicators of the past having fixed, non-adaptable processing elements, on the other hand, are rendered nonfunctional when even a single circuit element fails. FIG. 7 is a flowchart illustrating a procedure for use in enhancing graceful degradation in a communicator in accordance with the present invention. First, a plurality of processing tasks to be supported by the communicator 10 are identified (step 120). Each of the identified processing tasks are next assigned priority values based on the importance of the processing task (step 122). Resources in the plurality of RRUs are then allocated to the plurality of tasks based on priority (step 124). The plurality of RRUs 13 is continuously monitored to determine whether any of the RRUs have become non-functional (step 126). If it is determined that a unit failure has occurred, the operational RRUs are reconfigured to perform the processing tasks having the highest priority values. The reconfiguration can be performed by, for example, delivering the appropriate configuration files to the functioning RRUs. As can be appreciated, the above-described procedure results in a situation where the most critical processing functions are always available within the communicator despite one or more unit failures.

When a unit failure is detected, a message can be delivered to a user of the communicator 10, via user device 40, indicating that a failure has occurred and identifying the non-functioning RRU. The user may then replace the non-functioning unit with a spare. In accordance with one embodiment of the present invention, most or all of the RRUs used in a communicator are identical interchangeable units. Preferably, replacement units will be available off-the-shelf and will utilize standard interface connections. In one approach, the RRUs are implemented on small circuit boards that are insertable into standard expansion slots within a communicator. In an alternative embodiment, different types of RRUs are mixed in a single communicator.

In one aspect of the present invention, the communicator 10 is extensible. That is, the communicator 10 includes means for extending its capabilities by, for example, adding additional RRUs. For example, in one embodiment, the communicator 10 is equipped with a plurality of unused expansion slots so that a user can add more RRUs as his needs increase. Alternatively, the communicator 10 can be made extensible by allowing older RRUs to be replaced by newer RRUs having increased capacity and/or enhanced functionality.

It should be appreciated that the above description relates to specific embodiments of the present invention and is not intended to unduly limit the breadth of the invention. That is, various modifications can be made to the above-described structures without departing from the spirit and scope of the invention. For example, in one such modification, the communicator of the present invention is implemented in a wired communications system or a hybrid wired/wireless system, in which case some or all of the antennas 22a–22m are replaced by interfaces to one or more wired systems. In addition, the communicator of the present invention is not limited to transceiver applications. That is, the communicator can be implemented as a receiver, a transmitter, or any other processing apparatus within a communications system.

What is claimed is:

1. A communicator for use in a communications system, comprising:

a plurality of reconfigurable resource units for use in processing communications signals, each of said reconfigurable resource units being able to perform any of a plurality of different processing tasks based on a present configuration, wherein each of said reconfigurable resource units includes an input for receiving configuration information;

a memory for storing a library of configuration files for use in configuring said plurality of reconfigurable resource units; and a controller including means for determining processing tasks that need to be performed by said communicator and means for configuring said plurality of reconfigurable resource units in accordance with said processing tasks, wherein said controller is coupled to said memory for accessing said library of configuration files, wherein said means for configuring includes:
a resource allocation unit for allocating resources in said plurality of reconfigurable resource units to each of said processing tasks;
means for retrieving a first configuration file from said memory; and
means for delivering said first configuration file to a first location in said plurality of reconfigurable resource units, wherein said first location is determined by said resource allocation unit.

2. The communicator, as claimed in claim 1, wherein:
said resource allocation unit can allocate multiple reconfigurable resource units to perform a single task.

3. The communicator, as claimed in claim 1, wherein:
said resource allocation unit can allocate a single reconfigurable resource unit to perform multiple tasks.

4. The communicator, as claimed in claim 1, wherein:
said controller includes a file management unit for receiving configuration files from an exterior environment and for organizing configuration files in said memory.

5. The communicator, as claimed in claim 1, further comprising:
a configuration antenna, coupled to said controller, for receiving configuration information from an exterior environment.

6. The communicator, as claimed in claim 1, further comprising:
a channel monitor, coupled to said controller, for monitoring a spectral environment about said communicator, wherein said controller configures said plurality of reconfigurable resource units based on said spectral environment.

7. The communicator, as claimed in claim 1, further comprising:
a signal classifier, coupled to said controller, for determining a signal type of a communications signal received from a communications channel, wherein said controller configures said plurality of reconfigurable resource units based on said signal type.

8. The communicator, as claimed in claim 1, further comprising:
a signal bus coupled to at least two reconfigurable resource units for use in transferring communications signals to/from said at least two units.

9. The communicator, as claimed in claim 8, further comprising:
at least one antenna for providing an interface with a wireless communications channel, said at least one antenna being coupled to said signal bus.

10. The communicator, as claimed in claim 1, wherein:
at least one of said reconfigurable resource units in said plurality of reconfigurable resource units includes a field programmable gate array (FPGA) having a plurality of processing cells and an interconnection means for use in interconnecting said cells, wherein said interconnection means is responsive to input information for interconnecting said cells in a predetermined manner.

11. The communicator, as claimed in claim 10, wherein:
said library of configuration files includes a plurality of FPGA configuration data files that can be selectively transferred to said FPGA.

12. The communicator, as claimed in claim 10, wherein:
said FPGA is an analog FPGA capable of processing analog input signals.

13. The communicator, as claimed in claim 10, wherein:
said FPGA is a digital FPGA capable of processing digital input signals.

14. The communicator, as claimed in claim 1, wherein:
at least one of said reconfigurable resource units in said plurality of reconfigurable resource units includes a digital signal processor (DSP) having a random access memory (RAM) for storing software programs, said DSP being capable of executing software programs stored in said RAM, wherein said DSP includes means for receiving new software programs files from an exterior environment.

15. The communicator, as claimed in claim 14, wherein:
said library of configuration files includes a plurality of software program files that can be selectively downloaded to said DSP.

16. The communicator, as claimed in claim 15, wherein:
said plurality of software program files includes software objects, wherein said DSP includes linking means for linking software objects together.

17. The communicator, as claimed in claim 1, wherein:
at least two of said reconfigurable resource units in said plurality of reconfigurable resource units have identical architectures to one another.

18. The communicator, as claimed in claim 1, wherein:
said controller includes a central processing unit (CPU) and a random access memory (RAM), said CPU being capable of executing programs stored in said RAM, wherein said RAM includes a program for configuring said plurality of reconfigurable resource units in accordance with said processing tasks.

19. The communicator, as claimed in claim 1, further comprising:
a user interface, operatively located between said controller and an exterior environment, for use in communicating with a user of said communicator, wherein said user interface allows said user to deliver configuration information to said controller.

20. The communicator, as claimed in claim 19, wherein:
said configuration information includes at least one of the following: configuration commands instructing said controller to configure said plurality of reconfigurable resource units in a predetermined manner and configuration files for use by said controller in configuring said plurality of reconfigurable resource units.

21. The communicator, as claimed in claim 1, wherein said communicator is a handheld unit.

22. The communicator, as claimed in claim 1, wherein:
said communicator is located in a communications base station.

23. A communicator for use in a communications system, comprising:
a receiver having at least one input for receiving a configuration file for use in configuring said receiver to properly process a signal, having a predetermined signal type, received from a communications channel;
a memory for storing a plurality of configuration files, wherein each of said configuration files corresponds to a particular signal type that said receiver is able to receive;

a determination unit for determining a first signal type to be processed by said receiver; and a retrieval unit for retrieving a configuration file corresponding to said first signal type from said memory and for delivering said first configuration file to said at least one input of said receiver in response to said determination unit.

24. The communicator, as claimed in claim 23, wherein:

said determination unit includes a user interface for accepting a user specified signal type designation.

25. The communicator, as claimed in claim 23, further comprising:

a signal classifier for determining a signal type of a first signal received from said communications channel, wherein said determination unit is responsive to said signal classifier.

26. The communicator, as claimed in claim 23, wherein:

said plurality of configuration files includes a plurality of software modules, wherein each of said software modules is for use, in conjunction with a central processing unit, in processing a signal having a specific signal type.

27. The communicator, as claimed in claim 23, wherein:

said plurality of configuration files includes a plurality of configuration data files for use in configuring a reconfigurable hardware unit.

28. The communicator, as claimed in claim 27, wherein:

said reconfigurable hardware unit includes a field programmable gate array (FPGA).

29. The communicator, as claimed in claim 23, wherein said communicator is a handheld unit.

30. A communicator for use in a communications system, comprising:

a transmitter having at least one input for receiving a configuration file for use in configuring said transmitter to generate a transmit signal having a predetermined signal type;

a memory for storing a plurality of configuration files corresponding to a plurality of different signal types;

a determination unit for determining a first signal type to be generated by said transmitter during a particular period of time; and a retrieval unit for retrieving a configuration file corresponding to said first signal type from said memory and for delivering said configuration file to said at least one input of said transmitter.

31. The communicator, as claimed in claim 30, wherein:

said determination unit includes a user interface for accepting a user specified signal type designation.

32. The communicator, as claimed in claim 30, further comprising:

a channel monitor for monitoring a spectral environment about said communicator, wherein said determination unit is responsive to said channel monitor.

* * * * *